Figure 1:
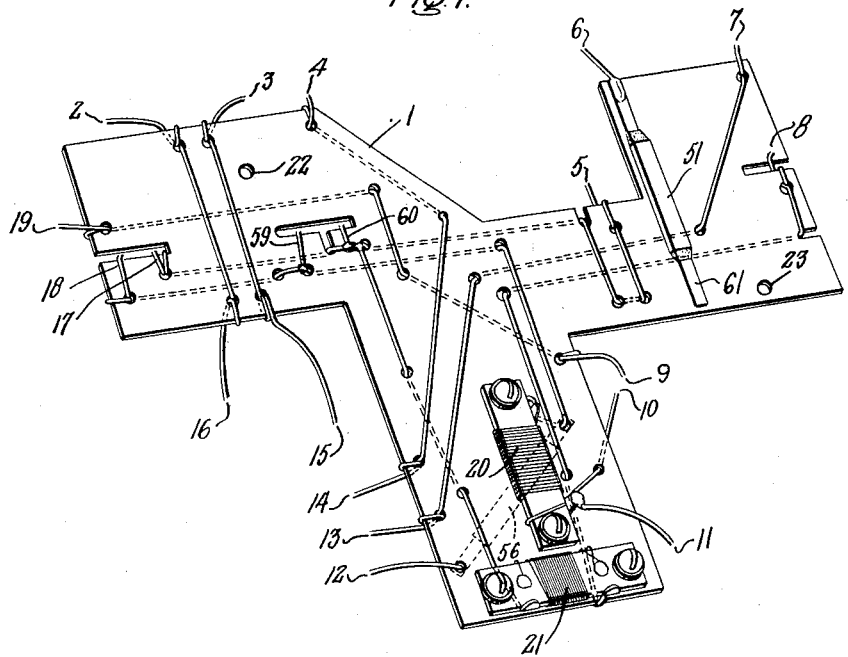

Dec. 5, 1933.   L. H. VAN BILLIARD   1,938,410
ASSEMBLY OF ELECTRICAL APPARATUS
Filed July 1, 1927   2 Sheets-Sheet 1

Inventor
Lewis H. Van Billiard,
by
His Attorney.

Dec. 5, 1933.　　　L. H. VAN BILLIARD　　　1,938,410
ASSEMBLY OF ELECTRICAL APPARATUS
Filed July 1, 1927　　　2 Sheets-Sheet 2
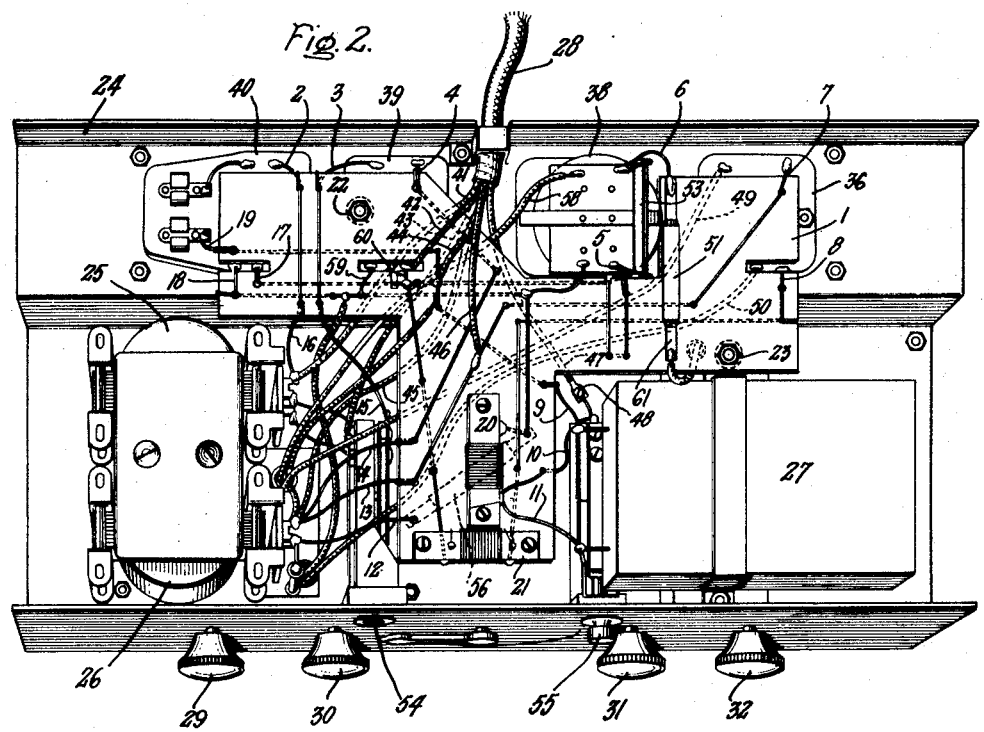
Inventor:
Lewis H. Van Billiard,
by
His Attorney.

Patented Dec. 5, 1933

1,938,410

UNITED STATES PATENT OFFICE 1,938,410

ASSEMBLY OF ELECTRICAL APPARATUS

Lewis H. Van Billiard, Schenectady, N. Y., assignor to General Electric Company, a corporation of New York Application July 1, 1927. Serial No. 202,970

6 Claims. (Cl. 250—16)

REISSUED

My invention relates to the manufacture of electrical apparatus comprising a plurality of different interconnected elements or parts, and has for its principal object the provision of an improved arrangement of parts and a method of assembly whereby the connections between such parts may be readily completed.

In assembling of electrical apparatus, such as a radio device for example, much labor is often consumed in arranging and completing the connections between the different parts of the apparatus. In accordance with my invention, this difficulty is avoided by mounting the connections upon an insulation sheet or member so that they are insulated from one another and are readily attached to the terminals of the various parts.

My invention will be better understood from the following description when considered in connection with the accompanying drawings and its scope will be pointed out in the appended claims.

Referring to the drawings, Fig. 1 illustrates an insulation member upon which a plurality of connections have been assembled in accordance with my invention; Fig. 2 illustrates a bottom view of a radio apparatus wherein my invention has been embodied; and Fig. 3 is a wiring diagram of this apparatus.

Fig. 1 illustrates an insulation member 1 upon which are mounted a plurality of conductors provided with terminals 2 to 19 and 59 to 61 arranged to be readily connected with different parts of the apparatus illustrated by Fig. 2. It will be noted that resistor elements 20 and 21, and condensers 51 and 56 are mounted on the insulation member 1 and that this member is provided with openings 22 and 23 whereby it may be attached to and spaced from the casing of the apparatus.

As indicated by Fig. 2, the apparatus comprises a metal casing 24 upon the under surface of which are supported the member 1, a pair of coupling transformers 25 and 26, a fixed condenser 27, and various other parts which are diagrammatically shown in Fig. 3. Power is supplied to the apparatus through a cable 28, and the operation of the apparatus is controlled by means of knobs 29, 30, 31 and 32.

As shown more clearly by Fig. 3, the apparatus comprises an antenna 33 and a receiver 34 which are interconnected through an amplifying and detecting arrangement comprising a coupling transformer 35, a space discharge device 36, a coupling transformer 37, a space discharge device 38, the coupling transformer 26, a space discharge device 39, the coupling transformer 25 and a space discharge device 40. The cable 28 comprises a plurality of conductors 41 to 47 through which power is supplied to the A, B and C circuits of the apparatus from any suitable source.

In assembling the apparatus, the sockets of the space discharge devices 36, 38, 39 and 40, the transformers 25 and 26, the condenser 27 and various other parts are mounted within the casing 24 as indicated in Fig. 2; the cable conductors 41, 43, 45 and 47 are connected respectively to a secondary terminal of the transformer 25, to a primary terminal of the transformer 25, to a secondary terminal of the transformer 26 and to ground at 48; the conductors 49, 50 and 58 are connected to the socket terminals of the devices 36 and 38; the insulation member 1 is attached to the casing 24 by means of bolts extending through the openings 22 and 23; the cable conductors 42, 44 and 46 are attached to different conductors supported on the insulation member 1; and the terminals 2 to 19 and 59 to 61 are connected to the various parts as indicated in Figs. 2 and 3. It will be noted that the various conductors supported on the insulation member 1 are threaded back and forth through openings in this member so that they are insulated from one another and have their terminals each located at a point adjacent the point of its connection to the apparatus when the member 1 is attached to the casing 24.

As will be readily understood from the foregoing description, the use of an insulation member arranged to insulate and support a plurality of conductors with their terminals adjacent the parts to which they are to be connected greatly facilitates the assembly of an apparatus comprising many parts which have to be interconnected with one another. While my invention has been illustrated and described as applied to a radio receiving apparatus, it will be apparent that it may be applied to many different types of electrical apparatus.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

1. The combination of a radio apparatus, and means for interconnecting the various parts of said apparatus including a perforated insulation member, and a plurality of conductors threaded through the perforations of said member and supported by said member with their terminals adjacent the terminals of the parts to which they are to be connected.

2. The combination of an electrical apparatus, and means for interconnecting the various parts of said apparatus including a perforated insulation member, and a plurality of conductors each threaded through a different perforation and supported by said member with its terminals adjacent the terminals of the parts to which they are to be connected.

3. A wiring unit for instrument panels having a series of terminals projecting from one face thereof, comprising a sheet of insulating material and a plurality of conductor wires fastened to said sheet in insulated relationship to each other, said wires being provided with connector portions positioned to engage selected terminals, said sheet supporting and maintaining said wires in fixed relationship to one another so that the unit may be placed on and removed from the instrument panel without disarrangement of the conductor wires.

4. A wiring unit for electrical apparatus having a plurality of terminals to be interconnected in a predetermined manner, comprising a base of insulating material, a plurality of conductors, connector portions at the ends of said conductors and means for maintaining said conductors on said base so that said connector portions extend beyond said base at predetermined positions.

5. A wiring unit for electrical apparatus comprising a sheet of insulating material, openings in said sheet, and a plurality of conductors supported on said sheet and threaded through said openings from one side to the other of the sheet to maintain said conductors in insulated and spaced relationship.

6. A wiring unit for electrical apparatus, comprising a sheet of insulating material, a conductor supported on said sheet, a second conductor supported on said sheet in a position such that it will cross the first mentioned conductor, and openings in said sheet, said second conductor being threaded through said openings so that it is on the opposite side of said sheet from the first conductor at the point where said conductors cross.

LEWIS H. VAN BILLIARD.